(12) United States Patent
Biederman

(10) Patent No.: US 9,678,361 B2
(45) Date of Patent: Jun. 13, 2017

(54) POWER DELIVERY FOR ACCOMMODATION BY AN EYE-MOUNTABLE DEVICE

(71) Applicant: VERILY LIFE SCIENCES LLC, Mountain View, CA (US)

(72) Inventor: William J. Biederman, Fox Island, WA (US)

(73) Assignee: Verily Life Sciences LLC, Mountain View, CA (US)

( * ) Notice: Subject to any disclaimer, the term of this patent is extended or adjusted under 35 U.S.C. 154(b) by 279 days.

(21) Appl. No.: 14/694,953

(22) Filed: Apr. 23, 2015

(65) Prior Publication Data

US 2015/0362751 A1    Dec. 17, 2015

Related U.S. Application Data

(60) Provisional application No. 62/012,005, filed on Jun. 13, 2014, provisional application No. 62/012,023, filed on Jun. 13, 2014.

(51) Int. Cl.
*G02F 1/1335* (2006.01)
*G02C 7/08* (2006.01)
(Continued)

(52) U.S. Cl.
CPC ............... *G02C 7/083* (2013.01); *G02C 7/04* (2013.01); *H02J 7/025* (2013.01); *H02J 50/10* (2016.02)

(58) Field of Classification Search
CPC ............ G02C 7/083; G02C 7/04; H02J 50/10
(Continued)

(56) References Cited

U.S. PATENT DOCUMENTS 6,415,181 B1    7/2002 Schu et al.
6,638,304 B2 *  10/2003 Azar ................. A61F 2/147
                                                    623/6.22
(Continued)

FOREIGN PATENT DOCUMENTS

EP    2 518 555 A1    10/2012
JP    2011/099999 A    5/2011
(Continued)

OTHER PUBLICATIONS

International Preliminary Report on Patentability for Application No. PCT/US2015/031418, mailed Dec. 22, 2016, 7 pages.
(Continued)

*Primary Examiner* — Lucy Chien
(74) *Attorney, Agent, or Firm* — Blakely Sokoloff Taylor & Zafman LLP

(57) ABSTRACT

Techniques and mechanisms to power automatic accommodation by an eye-mountable device. In an embodiment, the eye-mountable device includes an accommodation actuator to change an optical strength of the eye-mountable device. Control logic of the eye-mountable device is to transition a supply voltage between different levels to drive operation of the accommodation actuator, including the control logic to perform a step-wise transition of the supply voltage from a first voltage level to a second voltage level. In another embodiment, the control logic includes a bidirectional direct current to direct current (DC-DC) converter. During the step-wise transition of the supply voltage, the bidirectional DC-DC converter is configured to aid in recharging a battery of the eye-mountable device with charge from the accommodation actuator.

20 Claims, 8 Drawing Sheets

(51) Int. Cl.
*G02C 7/04* (2006.01)
*H02J 7/02* (2016.01)
*H02J 50/10* (2016.01)

(58) Field of Classification Search
USPC .......................................................... 349/13
See application file for complete search history.

(56) References Cited

U.S. PATENT DOCUMENTS

| | | |
|---|---|---|
| 7,311,398 B2 | 12/2007 | Kuiper et al. |
| 8,154,804 B2 | 4/2012 | McGinn et al. |
| 8,634,145 B2 | 1/2014 | Pugh et al. |
| 8,636,358 B2 | 1/2014 | Binder |
| 8,700,144 B2 | 4/2014 | Arfin et al. |
| 2004/0108984 A1 | 6/2004 | Ogasawara |
| 2008/0208335 A1 | 8/2008 | Blum et al. |
| 2009/0033863 A1 | 2/2009 | Blum et al. |
| 2012/0075712 A1 | 3/2012 | Pugh et al. |
| 2012/0140167 A1 | 6/2012 | Blum |
| 2012/0245444 A1 | 9/2012 | Otis et al. |
| 2012/0268712 A1 | 10/2012 | Egan et al. |
| 2013/0245754 A1 | 9/2013 | Blum et al. |
| 2013/0258275 A1 | 10/2013 | Toner et al. |
| 2013/0258277 A1 | 10/2013 | Pugh et al. |
| 2013/0338767 A1 | 12/2013 | Mazzocchi et al. |
| 2014/0098226 A1 | 4/2014 | Pletcher et al. |
| 2014/0107447 A1 | 4/2014 | Liu et al. |
| 2014/0107448 A1 | 4/2014 | Liu et al. |
| 2014/0192311 A1 | 7/2014 | Pletcher et al. |
| 2014/0192312 A1 | 7/2014 | Pletcher et al. |
| 2014/0192318 A1 | 7/2014 | Guth et al. |
| 2014/0194773 A1 | 7/2014 | Pletcher et al. |
| 2014/0209481 A1 | 7/2014 | Pletcher et al. |
| 2014/0213867 A1 | 7/2014 | Pletcher et al. |
| 2014/0240655 A1 | 8/2014 | Pugh et al. |
| 2014/0243971 A1 | 8/2014 | Pugh et al. |
| 2014/0327875 A1 | 11/2014 | Blum et al. |

FOREIGN PATENT DOCUMENTS

| | | |
|---|---|---|
| WO | WO 2013/086078 A1 | 6/2013 |
| WO | WO 2013/151728 A1 | 10/2013 |
| WO | WO 2014/106330 A1 | 7/2014 |
| WO | WO 2015/001120 A1 | 1/2015 |
| WO | WO 2015/015205 A1 | 2/2015 |

OTHER PUBLICATIONS

PCT/US2015/031418—International Search Report and Written Opinion, mailed Aug. 25, 2015, 10 pages.

De Smet, J. et al., "Progress toward a liquid crystal contact lens display", Journal of the SID 21/9, DOI: 10.1002/jsid.188, 2014 pp. 399-406.

Chernichenko, Dmitry, et al., "Adiabatic Charging of Capacitors by Switched Capacitor Converters with Multiple Target Voltages, 2012 IEEE 27th Convention of Electrical and Electronics Engineers in Israel", (2012), 4 pgs.

De Smet, J. et al., "A Liquid Crystal Based Contact Lens Display Using PEDOT: PSS and Obliquely Evaporated SiO2", Late-News Poster, SID 2012 DIGEST, pp. 1375-1378.

Milton, H. et al., "Optimization of refractive liquid crystal lenses using an efficient multigrid simulation", May 2012, vol. 20, No. 10, Optics Express, pp. 11159-11165.

Milton, H. et al., "Switchable liquid crystal contact lenses: dynamic vision for the ageing eye", Proc. of SPIE vol. 9004 90040H, 6 pages. Downloaded From: http://spiedigitallibrary.org/ on Mar. 28, 2014.

Milton, H. et al., "Electronic liquid crystal contact lenses for the correction of presbyopia", Apr. 2014, vol. 22, No. 7, DOI:10.1364/OE.22.008035, Optics Express, pp. 8035-8040.

Tremblay, E. et al. "Switchable telescopic contact lens", Jul. 2013, vol. 21, No. 13, DOI:10.1364/OE.21.015980, Optics Express, pp. 15980-15986.

\* cited by examiner

POWER DELIVERY FOR ACCOMMODATION BY AN EYE-MOUNTABLE DEVICE

RELATED APPLICATIONS

This application claims priority under the provisions of 35 U.S.C. §119(e) to U.S. Provisional Application No. 62/012,005 filed Jun. 13, 2014 and to U.S. Provisional Application No. 62/012,023 filed Jun. 13, 2014, both of which contents are hereby incorporated by reference.

BACKGROUND

1. Technical Field

This disclosure relates generally to the field of optics, and in particular but not exclusively, relates to contact lenses.

2. Background Art

Accommodation is a process by which the eye adjusts its focal distance to maintain focus on objects of varying distance. Accommodation is a reflex action, but can be consciously manipulated. Accommodation is controlled by contractions of the ciliary muscle. The ciliary muscle encircles the eye's elastic lens and applies a force on the elastic lens during muscle contractions that change the focal point of the elastic lens.

As an individual ages, the effectiveness of the ciliary muscle can degrade due to Presbyopia or other progressive age-related conditions affecting the focusing strength of the eye. Recent technologies have begun to provide for various devices that operate in or on a human eye to aid the visual focus of a user. For one type of these devices, an accommodating lens includes one or more liquid crystal elements and circuitry to apply an electrical current to change the index of refraction of the one or more elements.

However, the need to drive and control these liquid crystal elements results in significant power consumption during operation of such devices. The liquid crystal elements often have to be driven with signals having peak-to-peak voltage on the order of 5 Volts (V), and even up to 10V. Due to such power loads, users of the devices are required to frequently replace lens devices and/or to frequently recharge batteries operating the lens devices. Such requirements limit the ability of users to conveniently use these and other types of accommodating eye-mountable devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
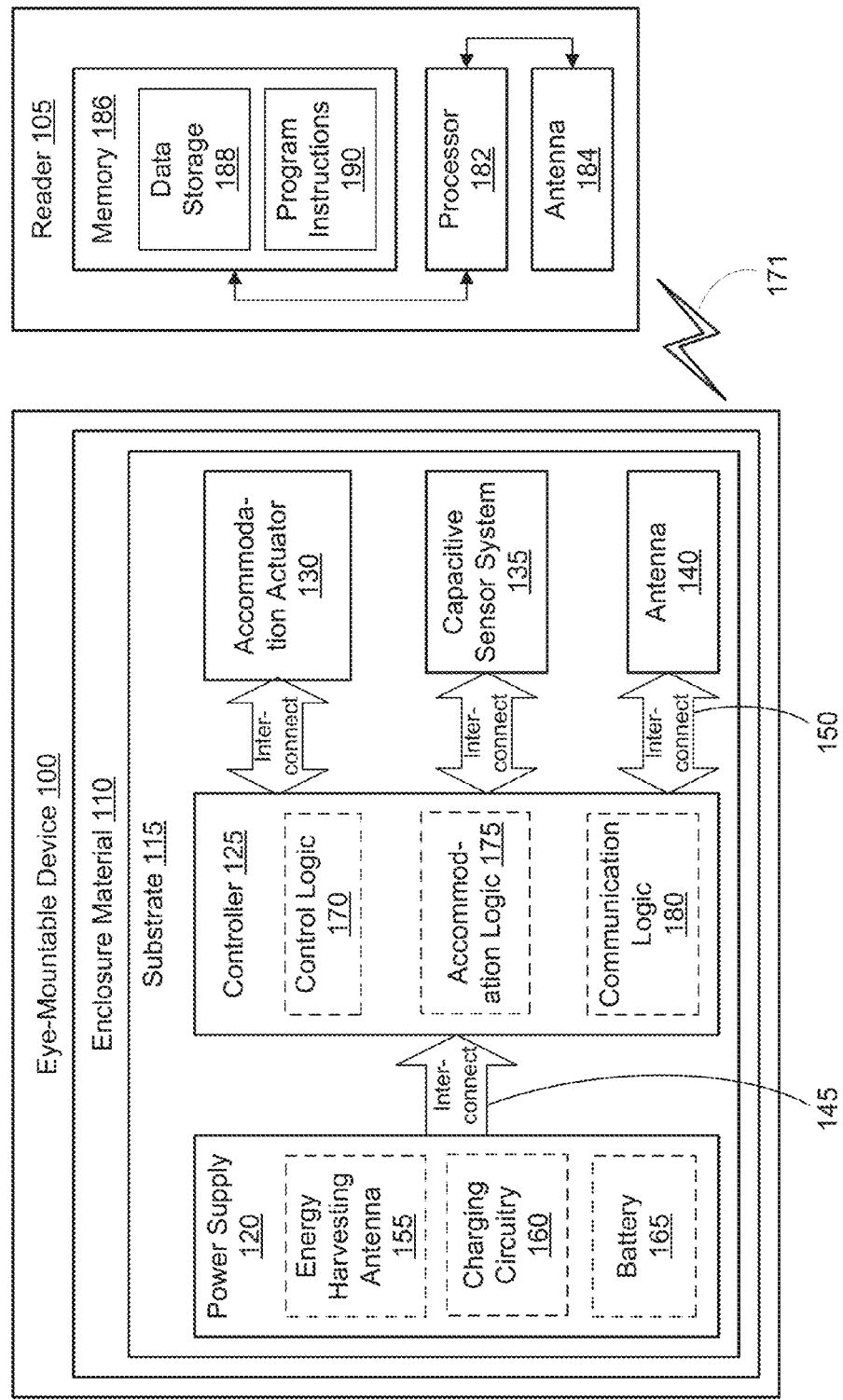
FIG. 1 is a functional block diagram of an eye-mountable device including power delivery circuitry in accordance with an embodiment of the disclosure.

Embodiments of an apparatus, system and methods of operation for a contact lens with power delivery and accommodation are described herein. In the following description numerous specific details are set forth to provide a thorough understanding of the embodiments. One skilled in the relevant art will recognize, however, that the techniques described herein may be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein is a smart contact lens or eye-mountable device that includes logic to provide power-efficient accommodation. Embodiments of the eye-mountable device may include power supply circuitry, control electronics and an accommodation actuator all embedded within an enclosure material formed to be contact mounted to an eye. The control electronics are coupled to drive the accommodation actuator to control the optical power of the eye-mountable device. In some embodiments, the power supply includes or couples to charging circuitry to control charging—e.g., including recharging—of an embedded battery.

The enclosure material may be fabricated of a variety of materials compatible for direct contact with a human eye, such as a polymeric material, a hydrogel, PMMA, silicone based polymers (e.g., fluoro-silicon acrylate), or otherwise. The enclosure material may be in the form of a round lens with a concave curvature configured to mount to a corneal surface of an eye. The electronics may be disposed upon a substrate embedded within the enclosure material near its periphery to avoid interference with incident light received closer to the central region of the cornea. In some embodiments, gaze direction or other focal distance information from a capacitive sensor, photodetector system or other sensor mechanism of the eye-mountable device may be used to determine the amount of accommodation to be applied via a see-through accommodation actuator positioned in a central portion of the enclosure material. The accommodation actuator may be coupled to the controller to be electrically manipulated thereby. For example, the accommodation actuator may be implemented with a liquid crystal cell that changes its index of refraction in response to an applied electrical bias signal. In other embodiments, the accommodation actuator may be implemented using other types of electro-active optical materials such as electro-optic materials that vary refractive index in the presence of an applied electric field or electro-mechanical structures that change the shape of a deformable lens. Other example structures that may be used to implement the accommodation actuator include electro-wetting optics, micro-electro-mechanical systems, or otherwise.

Features of various embodiments are described herein in the context of an eye-mountable accommodating lens device, wherein an optical strength (e.g., corresponding to a particular focal length) of the device may be changed based on capacitive gaze tracking mechanisms. However, such description may be extended to additionally or alternatively apply to any of a variety of other accommodating optical devices that may operate in or on an eye of a user. For example, certain embodiments are not limited with respect to a particular mechanism (e.g., liquid crystal element or other) by which an accommodation actuator changes an optical strength of the device. Furthermore, some embodiments are not limited with respect to a capacitive gaze tracking, photodetector gaze tracking of other technique that may be used to determine whether a change in optical strength is to take place.

FIG. 1 is a functional block diagram of an eye-mountable device 100 with power delivery mechanisms for auto-accommodation along with an external reader 105, in accordance with an embodiment of the disclosure. The exposed portion of eye-mountable device 100 is an enclosure material 110 formed to be contact-mounted to a corneal surface of an eye. A substrate 115 may be embedded within or surrounded by enclosure material 110 to provide a mounting surface for a power supply 120, a controller 125, an accommodation actuator 130, a capacitive sensor system 135, an antenna 140, and various interconnects 145 and 150. The illustrated embodiment of power supply 120 includes an energy harvesting antenna 155, charging circuitry 160, and a battery 165. The illustrated embodiment of controller 125 includes control logic 170, accommodation logic 175, and communication logic 180. The illustrated embodiment of reader 105 includes a processor 182, an antenna 184, and memory 186. The illustrated embodiment of memory 186 includes data storage 188 and program instructions 190.

Controller 125 may be coupled to receive feedback control signals from capacitive sensor system 135 and further coupled to operate accommodation actuator 130. Power supply 120 supplies operating voltages to the controller 125 and/or the accommodation actuator 130. Antenna 140 may be operated by the controller 125 to communicate information to and/or from eye-mountable device 100. In one embodiment, antenna 140, controller 125, power supply 120, and capacitive sensor system 135 are all situated on the embedded substrate 115. In one embodiment, accommodation actuator 130 may be embedded within enclosure material 110, but is not disposed on substrate 115. Because eye-mountable device 100 includes electronics and is configured to be contact-mounted to an eye, it is also referred to herein as an ophthalmic electronics platform, contact lens, or smart contact lens.

To facilitate contact-mounting, the enclosure material 110 may have a concave surface configured to adhere ("mount") to a moistened corneal surface (e.g., by capillary forces with a tear film coating the corneal surface). Additionally or alternatively, the eye-mountable device 100 may be adhered by a vacuum force between the corneal surface and enclosure material 110 due to the concave curvature. While mounted with the concave surface against the eye, the outward-facing surface of the enclosure material 110 may have a convex curvature that is formed to not interfere with eye-lid motion while the eye-mountable device 100 is mounted to the eye. For example, the enclosure material 110 may be a substantially transparent curved disk shaped similarly to a contact lens.

Enclosure material 110 may include one or more biocompatible materials, such as those employed for use in contact lenses or other ophthalmic applications involving direct contact with the corneal surface. Enclosure material 110 may optionally be formed in part from such biocompatible materials or may include an outer coating with such biocompatible materials. Enclosure material 110 may include materials configured to moisturize the corneal surface, such as hydrogels and the like. In some instances, enclosure material 110 may be a deformable ("non-rigid") material to enhance wearer comfort. In some instances, enclosure material 110 may be shaped to provide a predetermined, vision-correcting optical power, such as can be provided by a contact lens. Enclosure material may be fabricated of various materials including a polymeric material, a hydrogel, PMMA, silicone based polymers (e.g., fluoro-silicon acrylate), or otherwise.

Substrate 115 includes one or more surfaces suitable for mounting the capacitive sensor system 135, controller 125, power supply 120, and antenna 140. Substrate 115 may be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) may be patterned on substrate 115 to form circuitry, electrodes, etc. For example, antenna 140 may be formed by depositing a pattern of gold or another conductive material on substrate 115. Similarly, interconnects 145 and 150 may be formed by depositing suitable patterns of conductive materials on substrate 115. A combination of resists, masks, and deposition techniques may be employed to pattern materials on substrate 115. Substrate 115 may be a relatively rigid material, such as polyethylene terephthalate ("PET") or another material sufficient to structurally support the circuitry and/or electronics within enclosure material 110. Eye-mountable device 100 may alternatively be arranged with a group of unconnected substrates rather than a single substrate. For example, controller 125 and power supply 120 may be mounted to one substrate, while antenna 140 and capacitive sensor system 135 are mounted to another substrate and the two may be electrically connected via interconnects.

In some embodiments, power supply 120 and controller 125 (and the substrate 115) may be positioned away from the center of eye-mountable device 100 and thereby avoid interference with light transmission to the eye through the center of eye-mountable device 110. In contrast, accommodation actuator 130 may be centrally positioned to apply optical accommodation to the light transmitted to the eye through the center of eye-mountable device 110. For example, where eye-mountable device 100 is shaped as a concave-curved disk, substrate 115 may be embedded around the periphery (e.g., near the outer circumference) of the disk. In some embodiments, capacitive sensor system 135 includes one or more discrete capacitance sensors that are peripherally distributed to sense the eyelid overlap. In some embodiments, one or more capacitance sensors may also be positioned in the center region of eye-mountable device 100. Capacitive sensor system 135 and/or substrate 115 may be substantially transparent to incoming visible light to mitigate interference with light transmission to the eye.

Substrate 115 may be shaped as a flattened ring with a radial width dimension sufficient to provide a mounting platform for the embedded electronics components. Substrate 115 may have a thickness sufficiently small to allow the substrate to be embedded in enclosure material 110 without adversely influencing the profile of eye-mountable device 100. Substrate 115 may have a thickness sufficiently large to provide structural stability suitable for supporting the electronics mounted thereon. For example, substrate 115 may be shaped as a ring with a diameter of about 10 millimeters, a radial width of about 1 millimeter (e.g., an outer radius 1 millimeter larger than an inner radius), and a thickness of about 50 micrometers. Substrate 115 may optionally be aligned with the curvature of the eye-mounting surface of eye-mountable device 100 (e.g., convex surface). For example, substrate 115 may be shaped along the surface of an imaginary cone between two circular segments that define an inner radius and an outer radius. In such an example, the surface of substrate 115 along the surface of the imaginary cone defines an inclined surface that is approximately aligned with the curvature of the eye mounting surface at that radius.

In the illustrated embodiment, power supply 120 includes a battery 165 to power the various embedded electronics, including controller 125. Battery 165 may be inductively charged by charging circuitry 160 and energy harvesting antenna 155. In one embodiment, antenna 140 and energy harvesting antenna 155 are independent antennae, which serve their respective functions of energy harvesting and communications. In another embodiment, energy harvesting antenna 155 and antenna 140 are the same physical antenna that are time shared for their respective functions of inductive charging and wireless communications with reader 105. Additionally or alternatively, power supply 120 may include a solar cell ("photovoltaic cell") to capture energy from incoming ultraviolet, visible, and/or infrared radiation. Furthermore, an inertial power scavenging system may be included to capture energy from ambient vibrations.

Charging circuitry 160 may include a rectifier/regulator to condition the captured energy for charging battery 165 or directly power controller 125 without battery 165. Charging circuitry 160 may also include one or more energy storage devices to mitigate high frequency variations in energy harvesting antenna 155. For example, one or more energy storage devices (e.g., a capacitor, an inductor, etc.) may be connected to function as a low-pass filter. In an embodiment, charging circuitry includes or couples to a direct current to direct current (DC-DC) converter that, for example, is unidirectional or bidirectional.

Controller 125 contains logic to choreograph the operation of the other embedded components. Control logic 170 controls the general operation of eye-mountable device 100, including providing a logical user interface, power control functionality, etc. Accommodation logic 175 includes logic for monitoring feedback signals from capacitive sensor system 135, determining the current gaze direction or focal distance of the user, and manipulating accommodation actuator 130 in response to provide the appropriate accommodation. The auto-accommodation may be implemented in real-time based upon feedback from the capacitive gaze tracking, or permit user control to select specific accommodation regimes (e.g., near-field accommodation for reading, far-field accommodation for regular activities, etc.). Communication logic 180 provides communication protocols for wireless communication with reader 105 via antenna 140. In one embodiment, communication logic 180 provides backscatter communication via antenna 140 when in the presence of an electromagnetic field 171 output from reader 105. In one embodiment, communication logic 180 operates as a smart wireless radio-frequency identification ("RFID") tag that modulates the impedance of antenna 140 for backscatter wireless communications. The various logic modules of controller 125 may be implemented in software/firmware executed on a general purpose microprocessor, in hardware (e.g., application specific integrated circuit), or a combination of both.

Eye-mountable device 100 may include various other embedded electronics and logic modules. For example, a light source or pixel array may be included to provide visible feedback to the user. An accelerometer or gyroscope may be included to provide positional, rotational, directional or acceleration feedback information to controller 125.

It is noted that the block diagram shown in FIG. 1 is described in connection with functional modules for convenience in description, but does not necessarily connote physical organization. Rather, embodiments of eye-mountable device 100 may be arranged with one or more of the functional modules ("sub-systems") implemented in a single chip, multiple chips, in one or more integrated circuits, or otherwise.

External reader 105 includes an antenna 184 (or group of more than one antennae) to send and receive wireless signals 171 to and from eye-mountable device 100. External reader 105 also includes a computing system with a processor 182 in communication with a memory 186. Memory 186 may be a non-transitory computer-readable medium that may include, without limitation, magnetic disks, optical disks, organic memory, and/or any other volatile (e.g. RAM) or non-volatile (e.g. ROM) storage system readable by the processor 182. Memory 186 may include a data storage 188 to store indications of data, such as data logs (e.g., user logs), program settings (e.g., to adjust behavior of eye-mountable device 100 and/or external reader 105), etc. Memory 186 may also include program instructions 190 for execution by processor 182 to cause the external reader 105 to perform processes specified by the instructions 190. For example, program instructions 190 may cause external reader 105 to provide a user interface that allows for retrieving information communicated from eye-mountable device 100 or allows transmitting information to eye-mountable device 100 to program or otherwise select operational modes of eye-mountable device 100. External reader 105 may also include one or more hardware components for operating antenna 184 to send and receive wireless signals 171 to and from eye-mountable device 100.

External reader 105 may be a smart phone, digital assistant, or other portable computing device with wireless connectivity sufficient to provide the wireless communication link 171. External reader 105 may also be implemented as an antenna module that may be plugged in to a portable computing device, such as in an example where the communication link 171 operates at carrier frequencies not commonly employed in portable computing devices. In some instances, external reader 105 is a special-purpose device configured to be worn relatively near a wearer's eye to allow the wireless communication link 171 to operate with a low power budget. For example, the external reader 105 may be integrated in a piece of jewelry such as a necklace, earring, etc. or integrated in an article of clothing worn near the head, such as a hat, headband, etc.

Figure 2A:
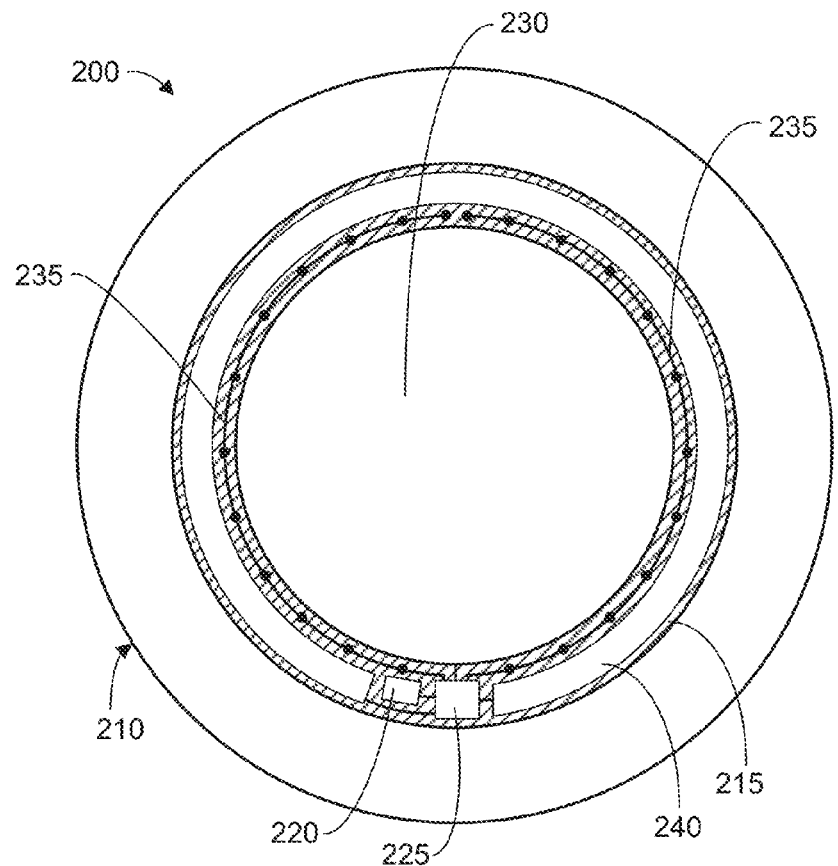
FIG. 2A is a top view of an eye-mountable device, in accordance with an embodiment of the disclosure.
Figure 2B:
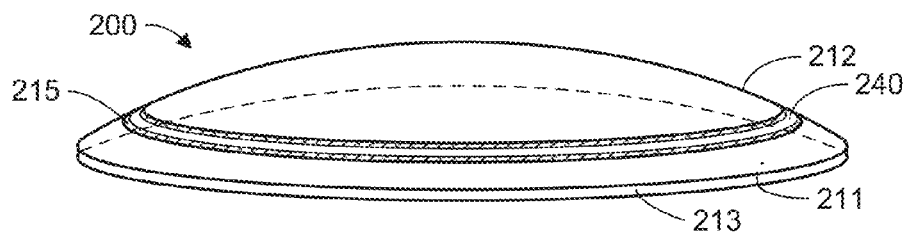
FIG. 2B is a perspective view of an eye-mountable device, in accordance with an embodiment of the disclosure.

FIGS. 2A and 2B illustrate two views of an eye-mountable device 200, in accordance with an embodiment of the disclosure. FIG. 2A is a top view of eye-mountable device 200 while FIG. 2B is a perspective view of the same. Eye-mountable device 200 is one possible implementation of eye-mountable device 100 illustrated in FIG. 1. The illustrated embodiment of eye-mountable device 200 includes an enclosure material 210, a substrate 215, a power supply 220, a controller 225, an accommodation actuator 230, a capacitive sensor system 235, and an antenna 240. It should be appreciated that FIGS. 2A and 2B are not necessarily drawn to scale, but have been illustrated for purposes of explanation only in describing the arrangement of the example eye-mountable device 200.

Enclosure material 210 of eye-mountable device 200 may be shaped as a curved disk. Enclosure material 210 is a substantially transparent material to allow incident light to be transmitted to the eye while eye-mountable device 200 is mounted to the eye. Enclosure material 210 may be a biocompatible material similar to those employed to form vision correction and/or cosmetic contact lenses in optometry, such as a polymeric material, polyethylene terephthalate ("PET"), polymethyl methacrylate ("PMMA"), polyhydroxyethylmethacrylate ("polyHEMA"), a hydrogel, silicon based polymers (e.g., fluoro-silicon acrylate) combinations of these, or otherwise. Enclosure material 210 may be formed with one side having a concave surface 211 suitable to fit over a corneal surface of an eye. The opposite side of the disk may have a convex surface 212 that does not interfere with eyelid motion while eye-mountable device 200 is mounted to the eye. In the illustrated embodiment, a circular or oval outer side edge 213 connects the concave surface 211 and convex surface 212.

Eye-mountable device 200 may have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of eye-mountable device 200 may be selected according to the size and/or shape of the corneal surface of the wearer's eye. Enclosure material 210 may be formed with a curved shape in a variety of ways. For example, techniques similar to those employed to form vision-correction contact lenses, such as heat molding, injection molding, spin casting, etc. may be employed to form enclosure material 210.

Substrate 215 may be embedded within enclosure material 210. Substrate 215 may be embedded to be situated along the outer periphery of enclosure material 210, away from the central region where accommodation actuator 230 is positioned. In the illustrated embodiment, substrate 215 encircles accommodation actuator 230. Substrate 215 may not interfere with vision because it is too close to the eye to be in focus and is positioned away from the central region where incident light is transmitted to the light-sensing portions of the eye. In some embodiments, substrate 215 may optionally be formed of a transparent material to further mitigate effects on visual perception. Substrate 215 may be shaped as a flat, circular ring (e.g., a disk with a centered hole). The flat surface of substrate 215 (e.g., along the radial width) may be a platform for mounting electronics and for patterning conductive materials to form electrodes, antenna (e), and/or interconnections.

Capacitive sensor system 235 may be distributed about eye-mountable device 200 to sense eyelid overlap in a manner similar to capacitive touch screens. By monitoring the amount and position of eyelid overlap, feedback signals from capacitive sensor system 235 may be measured by controller 225 to determine the approximate gaze direction and/or focal distance. Capacitive sensor system 235 may be disposed within enclosure material 210 on substrate 215. In the illustrated embodiment, capacitive sensor system 235 is distributed peripherally around accommodation actuator 230 along the inner edge of substrate 215 between antenna 240 and accommodation actuator 230. In other embodiments, capacitive sensor system 235 may be alternatively distributed in or on eye-mountable device 200. In the illustrated embodiment, capacitive sensor system 235 includes a plurality of discrete capacitance sensors coupled to a common read-line; however, various implementations include a single elongated capacitance sensor, a plurality of discrete capacitance sensors, multiple discrete capacitance sensors coupled in parallel via a common read-line, multiple independent branches of parallel coupled discrete capacitance sensors, etc.

Accommodation actuator 230 may be centrally positioned within enclosure material 210 to affect the optical power of eye-mountable device 200 in the user's center of vision. In various embodiments, accommodation actuator 230 operates by changing its index of refraction under the influence of controller 225. By changing its refractive index, the net optical power of the curved surfaces of eye-mountable device 200 may be altered, thereby applying controllable accommodation. Accommodation actuator 230 may be implemented using a variety of different electro-active optical devices. For example, accommodation actuator 230 may be implemented using a layer of liquid crystal (e.g., a liquid crystal cell) disposed in the center of enclosure material 210. In other embodiments, accommodation actuator 230 may be implemented using other types of electro-active optical materials such as electro-optic materials that vary refractive index in the presence of an applied electric field. Accommodation actuator 230 may be a distinct device embedded within enclosure material 210 (e.g., liquid crystal cell), or a bulk material having a controllable refractive index. In yet another embodiment, accommodation actuator 230 may be implemented using a deformable lens structure that changes shape under the influence of an electrical signal. Accordingly, the optical power of eye-mountable device 200 may be controlled by controller 225 with the application of electric signals via one or more electrodes extending from controller 225 to accommodation actuator 230.

Accommodation actuator 230 may be implemented using a variety of different liquid crystal structures including nematic liquid crystal, nematic twisted liquid crystal, cholesteric liquid crystal, or blue phase liquid crystal. Since a low switching voltage is desirable for low power chip design, nematic liquid crystals with switching voltages less than 5 V are suitable. With the application of a 5V control signal, refractive index switching ranging from approximately 1.74 in an off-mode to 1.52 in an on-mode is achievable. A refractive index shift of 0.2 should be sufficient to provide near-field accommodation for reading.

Returning to FIG. 2A, loop antenna 240 is a layer of conductive material patterned along the flat surface of the substrate to form a flat conductive ring. In some examples, to allow additional flexibility along the curvature of the enclosure material, loop antenna 240 may include multiple substantially concentric sections electrically joined together. Each section may then flex independently along the concave/convex curvature of eye-mountable device 200. In some examples, loop antenna 240 may be formed without making a complete loop. For instances, antenna 240 may have a cutout to allow room for controller 225 and power supply 220, as illustrated in FIG. 2A. However, loop antenna 240 may also be arranged as a continuous strip of conductive material that wraps entirely around the flat surface of substrate 215 one or more times. For example, a strip of conductive material with multiple windings may be patterned on the backside of substrate 215 opposite controller 225, power supply 220, and capacitive sensor system 235. Interconnects between the ends of such a wound antenna (e.g., the antenna leads) may then be passed through substrate 215 to controller 225.

Figures 3A, 3B:
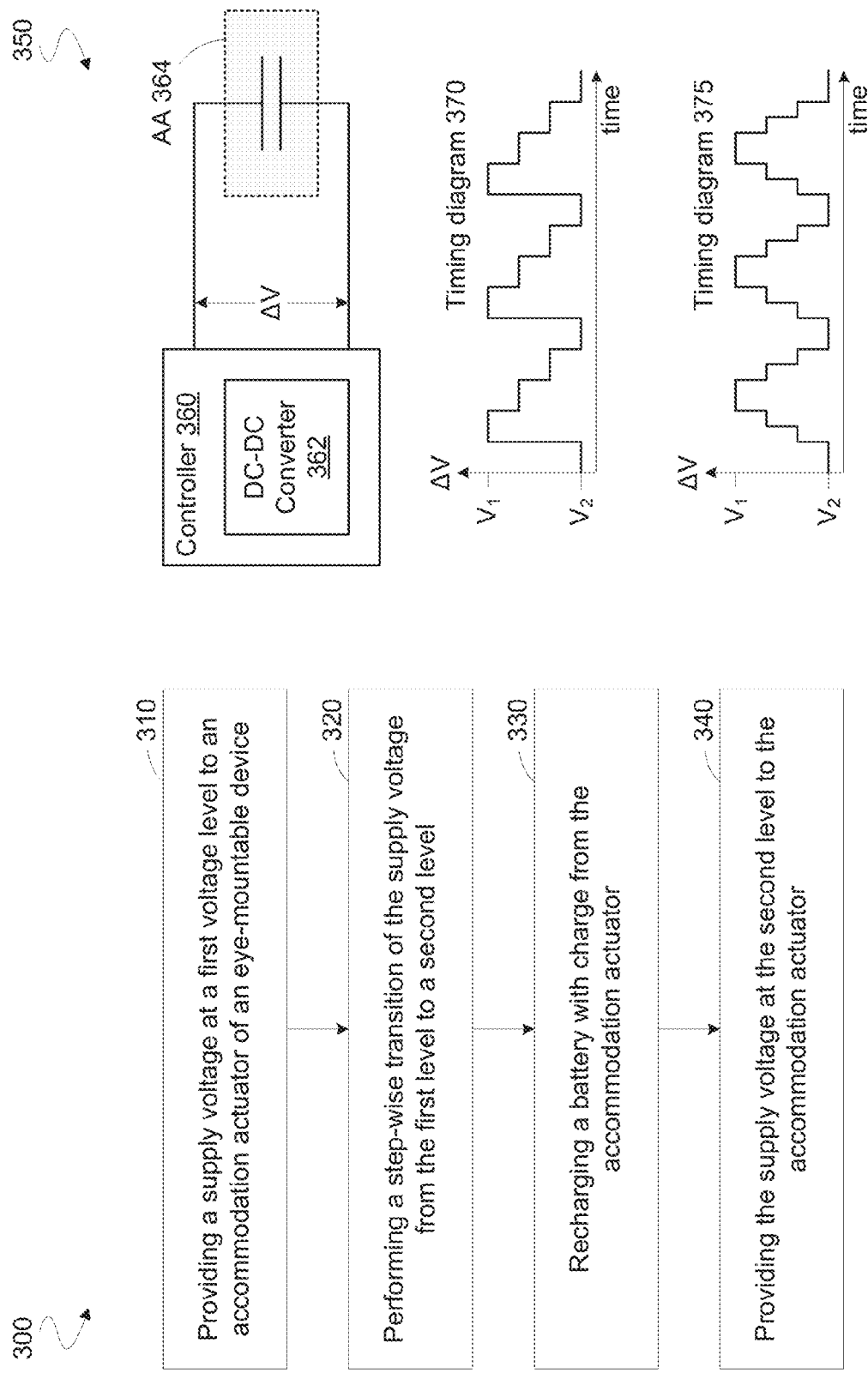
FIG. 3A is a flow diagram illustrating elements of a method for operating an eye-mountable device according to an embodiment of the disclosure.
FIG. 3B shows a functional block diagram and timing diagrams each illustrating respective elements of an eye-mountable device's operation according to a corresponding embodiment of the disclosure.

FIG. 3A illustrates elements of a method 300 for operating an eye-mountable device according to an embodiment. Method 300 may include operations to provide power for a device having some or all of the features of eye-mountable device 100, for example. In an embodiment, method 300 is performed with circuit logic such as that of controller 125. Features of method 300 are described herein with respect to an illustrative controller 360 of an eye-mountable device 350, as represented in FIG. 3B. However, such description may be extended to additionally or alternatively apply to other controller logic, as variously set forth herein.

Method 300 may include, at 310, providing a supply voltage at a first level to an accommodation actuator of the eye-mountable device. For example, method 300 may control a voltage differential across one or more components of the accommodation actuator, where the voltage differential is the supply voltage or is otherwise based on the supply voltage. The eye-mountable device may include an enclosure material in which the accommodation actuator is disposed—e.g., where the enclosure material has both a concave surface configured to be removeably mounted over a cornea of a user and a convex surface configured to be compatible with eyelid motion of the user. The eye-mountable device may have a first optical strength (e.g., including an ability to focus light at a first focal length) in response to the first level of the supply voltage. For example, the accommodation actuator may include a LC cell, where an index of refraction of the LC cell depends at least in part upon a level of the supply voltage.

In an embodiment, method 300 further comprises, at 320, performing a step-wise transition of the supply voltage from the first level to a second level (other than the first level). Performance of the transition at 320 may include successively maintaining the supply voltage at each of one or more intermediate levels between the first level and the second level. As shown in FIG. 3B, controller 360 may, at different times, variously change and maintain different levels of a voltage differential $\Delta V$ across an accommodation actuator AA 364 of eye-mountable device 350. Such a voltage differential $\Delta V$ may be changed by single-ended driver circuitry of controller 360 maintaining one electrode coupled to AA 364 at a reference potential (such as ground) and varying the voltage of another electrode coupled to AA 364. Alternatively or in addition, $\Delta V$ may be changed by differential driver circuitry of controller 360 switching and/or otherwise varying each of the respective potentials of the two electrodes relative to a reference potential. As shown in timing diagram 370, the transition at 320 may include controller 360 decreasing $\Delta V$ step-wise from a voltage level $V_1$ to another voltage level $V_2$ after a single jump of $\Delta V$ from $V_2$ to $V_1$. In another embodiment, illustrated by timing diagram 375, the transition at 320 may occur after a step-wise increase of $\Delta V$ from $V_2$ to $V_1$. Either or each of $V_2$ to $V_1$ may be positive (or alternatively, negative) potential values. For example, $V_1$ may be positive potential and $V_2$ may be negative potential. $V_2$ may be equal to zero—e.g., where controller 360 provides a ground voltage or other reference potential on both electrodes across AA 364.

During the step-wise transition at 320, method 300 may, at 330, recharge a battery with charge from the accommodation actuator. For example, AA 364 is represented in FIG. 3B as a capacitor to indicate that one or more components of AA 364—e.g., including one or more LC cells—may begin to store charge in response to an increase in $\Delta V$ and/or begin to loose charge in response to a decrease in $\Delta V$. The recharging at 330 may be performed with a bidirectional direct current to direct current (DC-DC) converter of a controller circuit, such as the illustrative DC-DC converter 362 of controller 360. DC-DC converter 362 may be coupled to the electrodes providing $\Delta V$ across AA 364. In response to a decrease in $\Delta V$, DC-DC converter 362 may draw charge stored by AA 364 during a preceding period when $\Delta V$ was comparatively large. Instead of being lost to a ground or other reference potential, such charge may be used by DC-DC converter 362 to recharge a battery (not shown) of eye-mountable device 350 that is included in or coupled to controller 360. The battery recharged (at least partially) at 330 may include, for example, battery 165 or other rechargeable battery of the eye-mountable device.

Method 300 may further comprise, at 340, providing the accommodation actuator with the supply voltage at the second level—e.g., including maintaining $\Delta V$ at $V_2$. The eye-mountable device may have a second optical strength (e.g., including an ability to focus light at a second focal length other than that of the first optical strength) in response to the second level of the supply voltage.

Although certain embodiments are not limited in this regard, method 300 may include additional operations (not shown) to repeatedly perform in sequence cycles including respective step-wise transitions of the supply voltage—e.g., as variously illustrated by timing diagrams 370, 375. Repeated voltage increases (e.g., step-wise) and step-wise decreases may cause the accommodation actuator to change an optical strength (e.g., changing an index of refraction) at a frequency that is imperceptible to the human eye. For example, such charging/discharging cycles may occur at a frequency of at least approximately 60 Hz (±6 Hz), although certain embodiments are not limited in this regard. As a result, the accommodation actuator may be perceived by a user as having the same average optical strength across multiple cycles of the accommodation actuator being charged and discharged by controller 360. A change to the perceived optical strength of the eye-mounted device may include stopping such cycles or changing a voltage level and/or frequency of such cycles.

Certain embodiments variously provide for improved power efficiency during some or all cycles to charge and discharge an accommodation actuator. For example, a step-wise decrease of the supply voltage allows for recovery of battery charge with a bidirectional DC-DC converter. In some embodiments, a step-wise increase of the supply voltage allows for less power consumption by the accommodation actuator without affecting the optical strength of the eye-mountable device, as perceived by a user. Method 300 may apply a maximum voltage difference across the accommodating actuator that, for example, is equal to or less than 8V. By way of illustration and not limitation, a maximum voltage difference between $V_1$ and $V_2$ may be less than or equal to 5V—e.g., where the difference is equal to 4V. Such a differential voltage may result, for example, from different terminals coupled to AA 364 each being variously transitioned in a voltage range from 0V to 4V, resulting in a voltage across AA 364 having a 8V peak-to-peak waveform.

Figure 4:
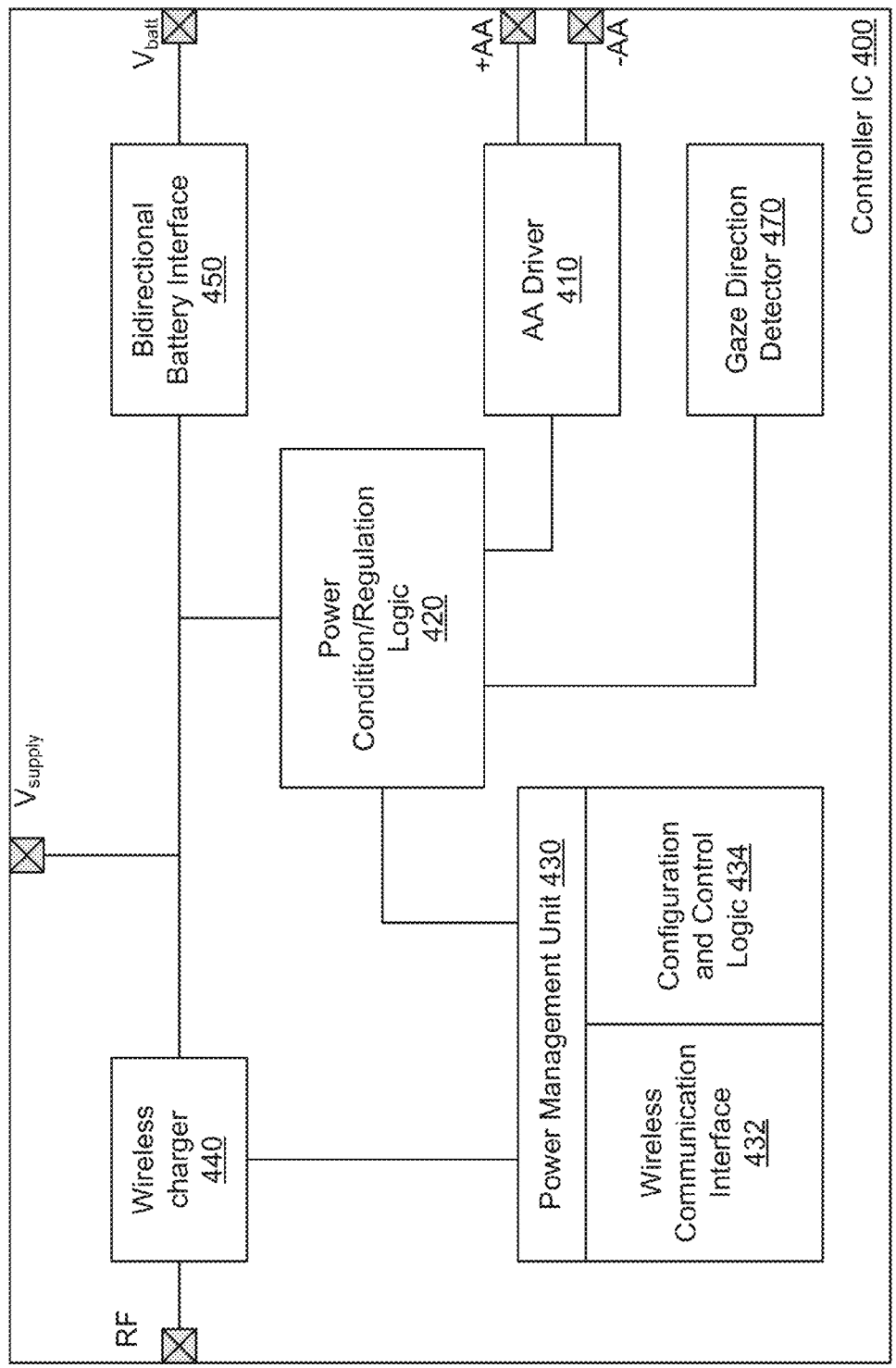
FIG. 4 is a functional block diagram illustrating elements of a controller integrated circuit of an eye-mountable device according to an embodiment of the disclosure.

FIG. 4 illustrates elements of a controller integrated circuit (IC) 400 to deliver power to an accommodating actuator of an eye-mountable device according to an embodiment. Controller IC 400 may include some or all features of one of controllers 125, 360, for example. In an embodiment, controller IC 400 includes circuitry to perform some or all operations of method 300.

Controller IC 400 includes an accommodation actuator (AA) driver 410 to couple to the accommodation actuator (not shown) via contacts +AA, −AA. AA driver 410 may operate under the control of power condition/regulation logic 420 of controller IC 400, which in turn may be responsive to one or more detected condition of the eye-mountable device, of a user thereof and/or of an environment thereof. One example of logic that might provide for detection of such one or more conditions is represented by gaze direction detector 470 of controller IC 400. Operation of power condition/regulation logic 420 to regulate AA driver 410 may be additionally or alternatively based on signal exchanges with a power management unit (PMU) 430 of controller IC 400.

Under control by power condition/regulation logic 420, AA driver 410 may provide a voltage differential across one or more components of the accommodation actuator. Such providing may include—e.g., according to method 300—performing a step-wise transition between different levels of a supply voltage with one or both of contacts +AA, −AA. In an illustrative scenario according to one embodiment, gaze direction detector 470 may provide to power condition/regulation logic 420 an indication that a user is gazing in a particular direction. In response, power condition/regulation logic 420 may identify and configure an operational mode corresponding to the indicated direction of gaze. For example, power condition/regulation logic 420 may signal configuration and control logic 424 of PMU 430 to determine whether the direction of gaze corresponds to a configuration to implement a relatively high optical strength, or another configuration to implement a relatively low optical strength.

Configuration and control logic 434 may include or otherwise provide access to one or more media to store configuration information identifying different operational modes of the eye-mountable device—e.g., where some or all such operational modes each corresponds to a different respective optical strength. Alternatively or in addition, such configuration information may describe one or more device power management modes, communication modes, management modes and/or the like. Configuration and control logic 434 may have access to such information based on communications by controller IC 400 with a reader or other remote agent (not shown). For example, PMU 430 may include or couple to a wireless communication interface (e.g, a RFID radio 432) that communicates with one or more antennae (not shown) via an antenna contact RF. Wireless communication interface 432 represents one example of communication functionality, such as that of communication logic 180, to receive configuration information for use in determining operation of power condition/regulation logic 420, AA driver 410 and/or the like.

Based on exchanges with gaze direction detector 470 (or other such detection logic) and/or with PMU 430, power condition/regulation logic 420 may provide one or more voltages and/or one or more control signals to regulate how AA driver 410 is to maintain or transition between different voltage levels at different times. During a step-wise transition between such voltage levels, charge accumulated by the accommodation actuator may be used to recharge the battery with a bidirectional DC-DC converter—as represented by the illustrative bidirectional battery interface 450. Although AA driver 410 is shown as coupled to bidirectional battery interface 450 via power condition/regulation logic 420, AA driver 410 may be coupled directly to bidirectional battery interface 450 in other embodiments. Alternatively, power condition/regulation logic 420 may include bidirectional battery interface 450 (or another DC-DC converter circuit).

Although certain embodiments are not limited in this regard, bidirectional battery interface 450 may further provide for battery recharging from one or more other power sources. One example of such alternative power sources is an energy harvesting antenna (not shown)—e.g., coupled via contact RF. A wireless charger 440 may provide for powering of PMU 430 and/or other circuitry of controller IC 400 based on power from an energy harvesting antenna. Other examples of such alternative power sources include a solar cell or inertial power scavenging system (not shown)—e.g., coupled via a contact $V_{supply}$.

Figure 5A:
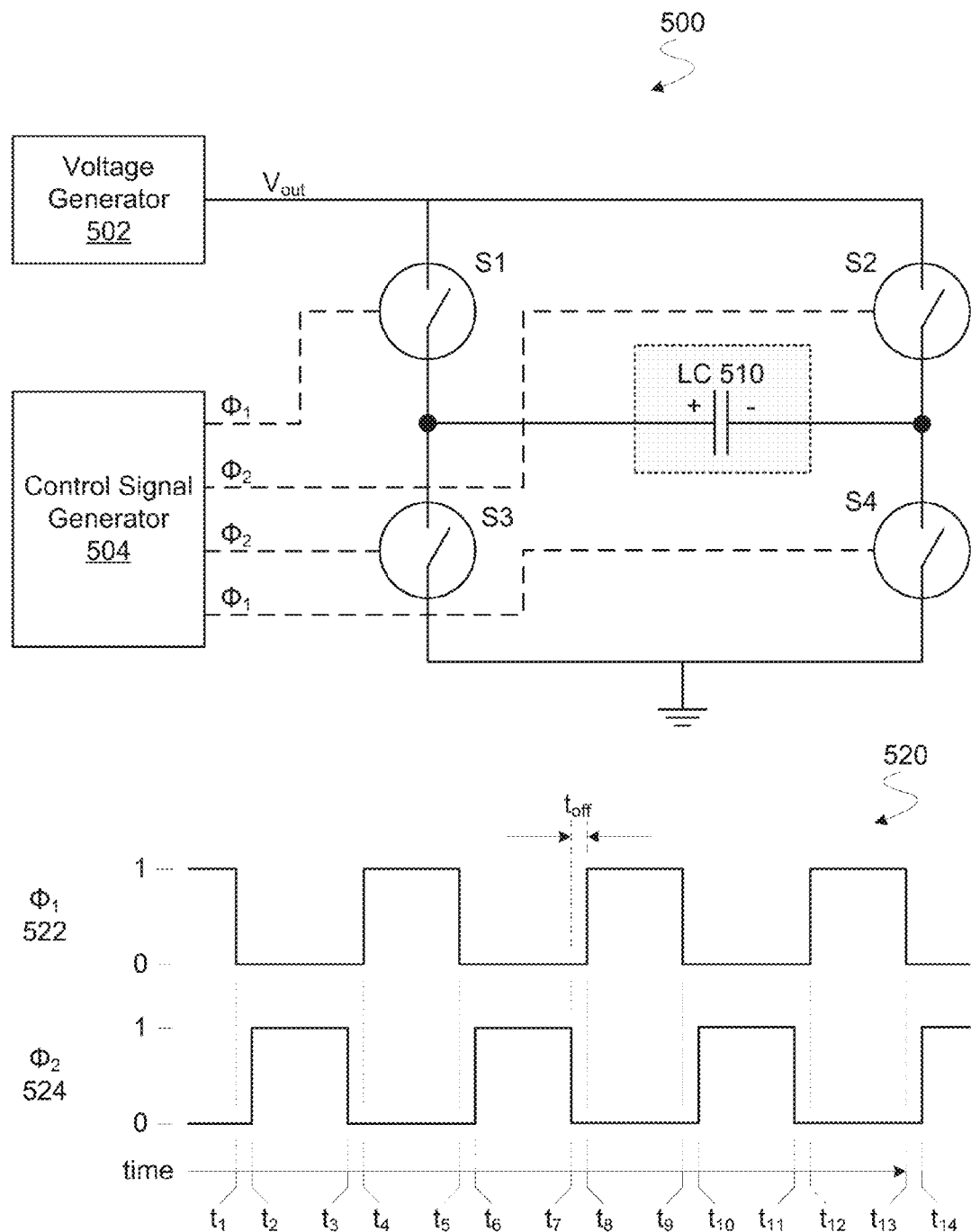
FIG. 5A shows a functional block diagram and a timing diagram each illustrating respective elements of an eye-mountable device's operation according to a corresponding embodiment of the disclosure.
Figure 5B:
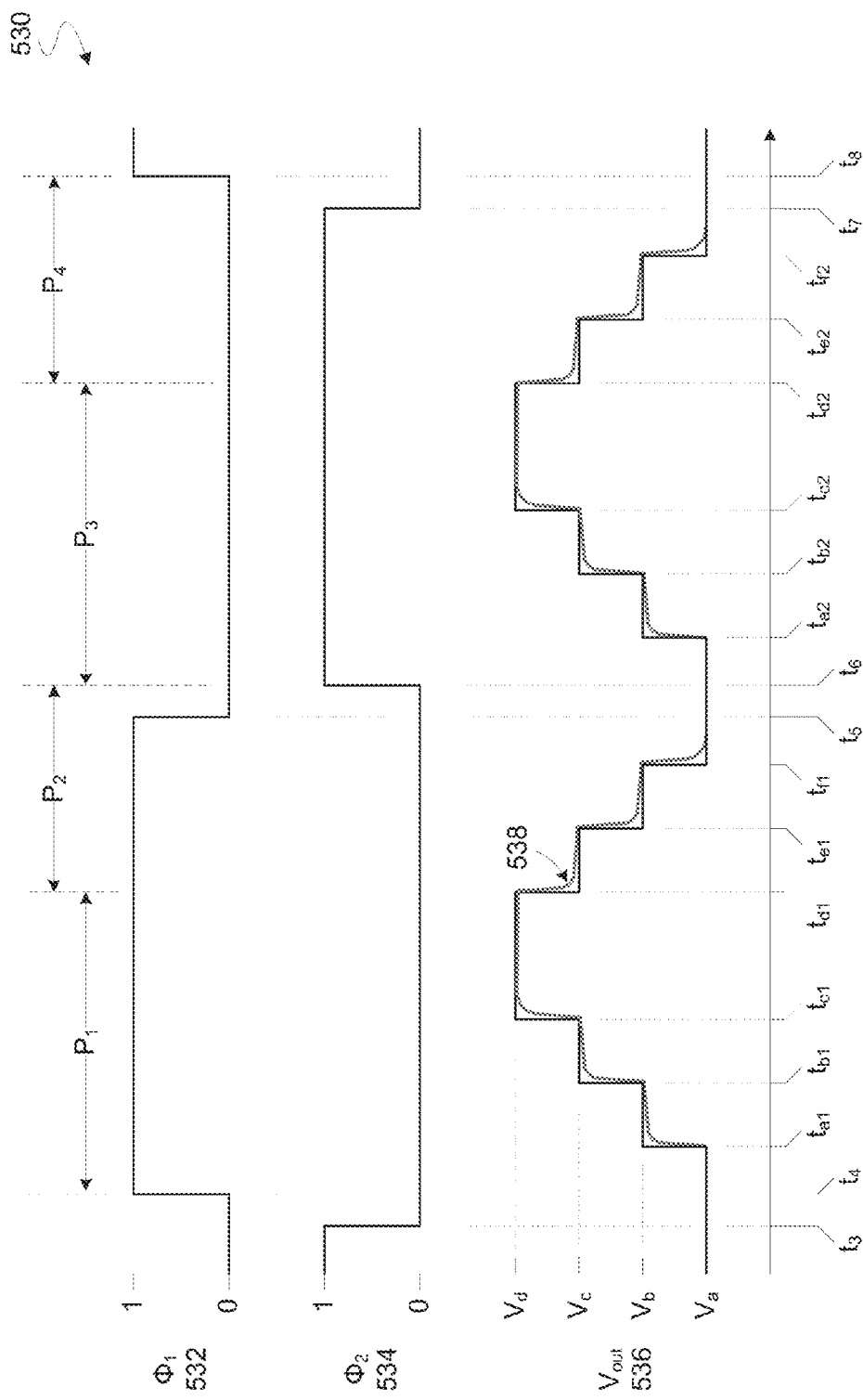
FIG. 5B is a timing diagram illustrating operation of an eye-mountable device according to an embodiment of the disclosure.

FIG. 5A illustrates elements of an eye-mountable device 500 to provide automatic accommodation according to an embodiment. Device 500 may include some or all of the features of one of eye-mountable devices 100, 200, 350, for example. In an embodiment, operation of device 500 includes performing method 400.

Device 500 includes an accommodating actuator, as represented by the illustrative one or more liquid crystal cells LC 510, and control circuitry to variously change an index of refraction of the accommodating actuator. LC 510 may include liquid crystal and/or other materials that are not bistable—e.g., where such materials tend to break down if they remain at a particular potential for extended periods of time. To avoid such degradation of LC 510, the control circuitry may include, for example, switches S1, S2, S3, S4 variously coupled each between LC 510 and a respective one of a reference potential (e.g., a ground or a bias voltage) and an output $V_{out}$ of a voltage generator 502. Switches S1, S4 may be operated by a signal $\Phi_1$ from a control signal generator 504—e.g., where control signal generator 504 further provides a signal $\Phi_2$ to control switches S2, S3. Voltage generator 503 and clock generator 504 may be circuitry of power condition/regulation logic 420—e.g., where AA driver 410 includes switches S1, S2, S3, S4. In another embodiment, AA driver 410 includes voltage generator 503 and switches S1, S2, S3, S4.

In an illustrative scenario according to one embodiment, operation of device 500 includes control signaling such as that represented in timing diagram 520. As shown in timing diagram 520, control signals $\Phi_1$ 522, $\Phi_2$ 524 may, over a period including times $t_1, t_2, \ldots, t_{14}$, variously transition—e.g., out of phase with one another—between respective logic high ('1') states and logic low ('0') states. As a result, a direction of coupling of LC 510 between a node providing $V_{out}$ and another node providing the reference potential may be alternately reversed in each cycle of signals $\Phi_1$ 522, $\Phi_2$ 524. The time duration $t_{off}$ should be greater than a time required for one or any of switches S1, S2, S3, S4 to complete a switch state transition—e.g., from closed to open.

A detailed view of timing diagram 520 according to one embodiment is represented by timing diagram 530 of FIG.

5B. In timing diagram 530, control signals $\Phi_1$ 532, $\Phi_2$ 534 (e.g., control signals $\Phi_1$ 522, $\Phi_2$ 524, respectively) transition between respective logic high states and logic low states during a period including times $t_3$, $t_4$, . . . , $t_8$. Concurrently, a voltage $V_{out}$ 536—e.g., output by voltage generator 502—may transition step-wise among a plurality of voltage levels, as represented by the illustrative levels $V_a$, $V_b$, $V_c$, $V_d$. The particular number and levels of $V_a$, $V_b$, $V_c$, $V_d$ and the transitions of $V_{out}$ 536 between $V_a$, $V_b$, $V_c$, $V_d$ are merely illustrative, and may vary according to certain embodiments.

The timing of control signals $\Phi_1$ 532, $\Phi_2$ 534 (and corresponding inverted control signals) and of the varying levels of $V_{out}$ 536 may result in a voltage 538 across LC 510. For example, various types of charge accumulation or reduction may take place in different periods at respective sides—e.g., electrodes—of LC 510. In FIG. 5A, first and second sides of electrode LC 510 are distinguished from one another, respectively, by a plus symbol (+) and a negative symbol (−). However, the electrical coupling of such sides relative to a $V_{out}$ node is not fixed, and is even reversed, during the period including times $t_1$, $t_2$, . . . , $t_{14}$.

As illustrated in timing diagram 530, signals $\Phi_1$ 532, $\Phi_2$ 534, their corresponding inverted control signals, and level changes of $V_{out}$ 536 may result in an accumulation of negative charge at the second (−) side of LC 510 and accumulation of positive charge at the first (+) side of LC 510 during a period P1 that is between times $t_4$, $t_{d1}$ and includes times $t_{a1}$, $t_{b1}$, $t_{c1}$. A period P2, which is between times $t_{d1}$, $t_6$ and includes times $t_{e1}$, $t_{f1}$, is a period of decreasing negative charge at the second (−) side of LC 510 and decreasing positive charge at the first (+) side of LC 510. An accumulation of negative charge at the first (+) side of LC 510 and an accumulation of positive charge at the second (−) side of LC 510 may take place during a period P3 which is between times $t_6$, and $t_{d2}$ and includes times $t_{a2}$, $t_{b2}$, $t_{c2}$. A period P4, which is between times $t_{d2}$, $t_6$ and includes times $t_{e2}$, $t_{f2}$, period of decreasing negative charge at the first (+) side of LC 510 and decreasing positive charge at the second (−) side of LC 510. A bi-directional DC-DC converter may aid in battery recharging—e.g., during P2 and/or P4.

Figure 6A:
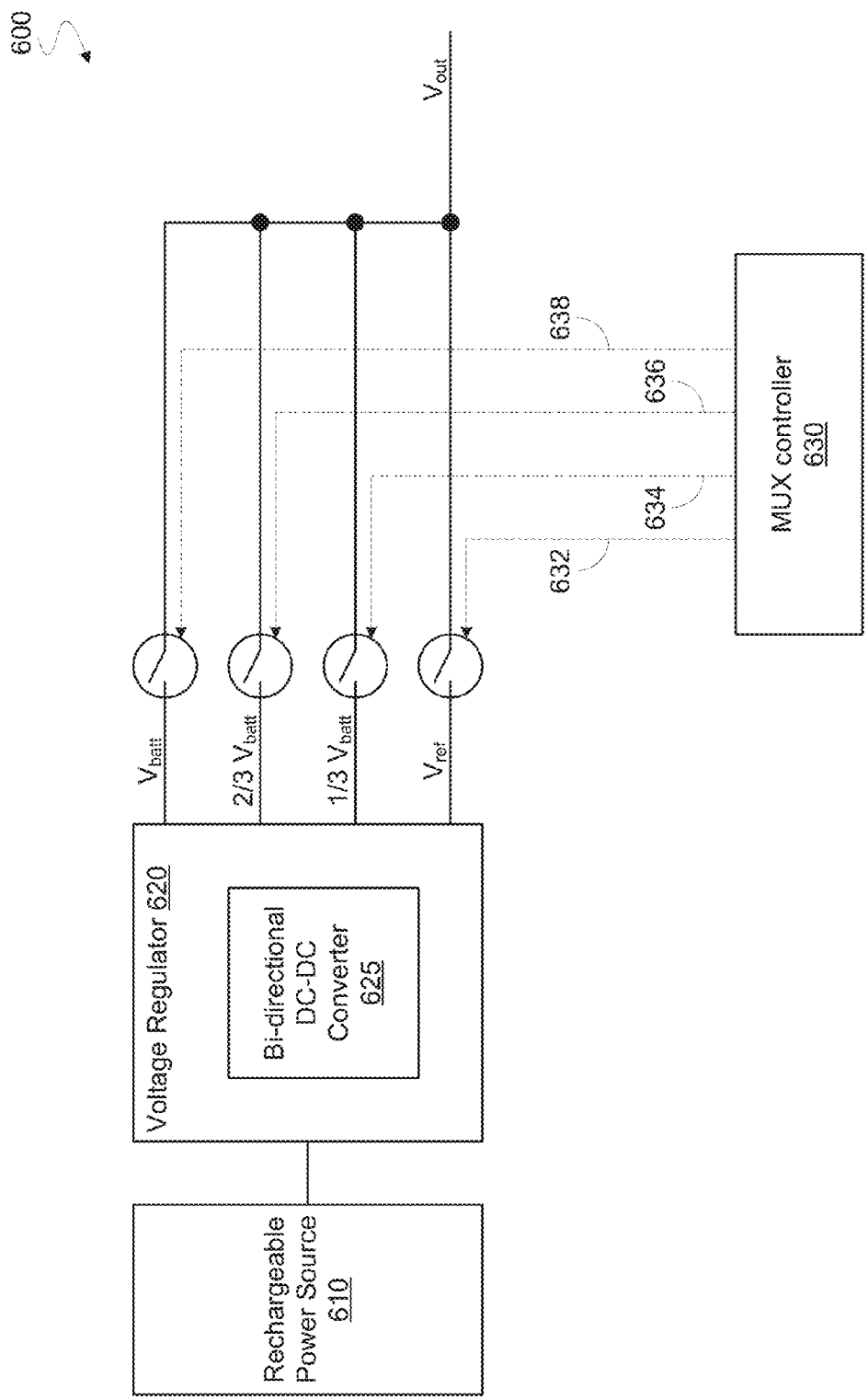
FIG. 6A is a functional block diagram illustrating elements of accommodation control logic according to an embodiment of the disclosure.

FIG. 6A illustrates elements of circuitry 600 to control accommodation by an eye-mountable device according to an embodiment. Circuitry 600 may provide some or all of the functionality of substrate 115 or controller IC 400—e.g., where circuitry includes or is a component of controller 125. In an embodiment, circuitry 600 is configured to perform one or more operations of method 300.

Circuitry 600 may include—or alternatively, couple to—a rechargeable power source 610 such as battery 165. A voltage regulator 620 of circuitry 600 may be coupled to receive a voltage from rechargeable power source 610, voltage regulator 620 is variously configured at different times to provide different voltage levels at an output $V_{out}$. For example, a multiplex (MUX) controller 630 of circuitry 600 may variously provide control signals—as represented by the illustrative signals 632, 634, 636, 638—each to switchedly couple an output $V_{out}$ to (and/or decouple $V_{out}$ from) a different respective output of voltage regulator 620. Such control signals may variously provide for a transition (e.g., stepwise) of output $V_{out}$ between a voltage level $V_{batt}$ and a reference voltage $V_{ref}$. A bi-directional DC-DC converter 625 included in or coupled to voltage regulator 620 may provide for recharging of rechargeable power source 610.

In the illustrative embodiment of FIG. 6A, signals 632, 634, 636, 638 provide for stepwise transition among $V_{batt}$, two-third (⅔) $V_{batt}$, one-third (⅓) $V_{batt}$, and $V_{ref}$—e.g., where such transition is represented by one or both of timing diagrams 520, 530. However, the total number of such voltages and their respective levels is merely illustrative, and may vary according to different embodiments. In one embodiment, $V_{out}$ is coupled to other switch logic (not shown) of an accommodation actuator driver. Such switch logic may include, for example, switches S1, S2 of eye-mountable device 500.

Figure 6B:
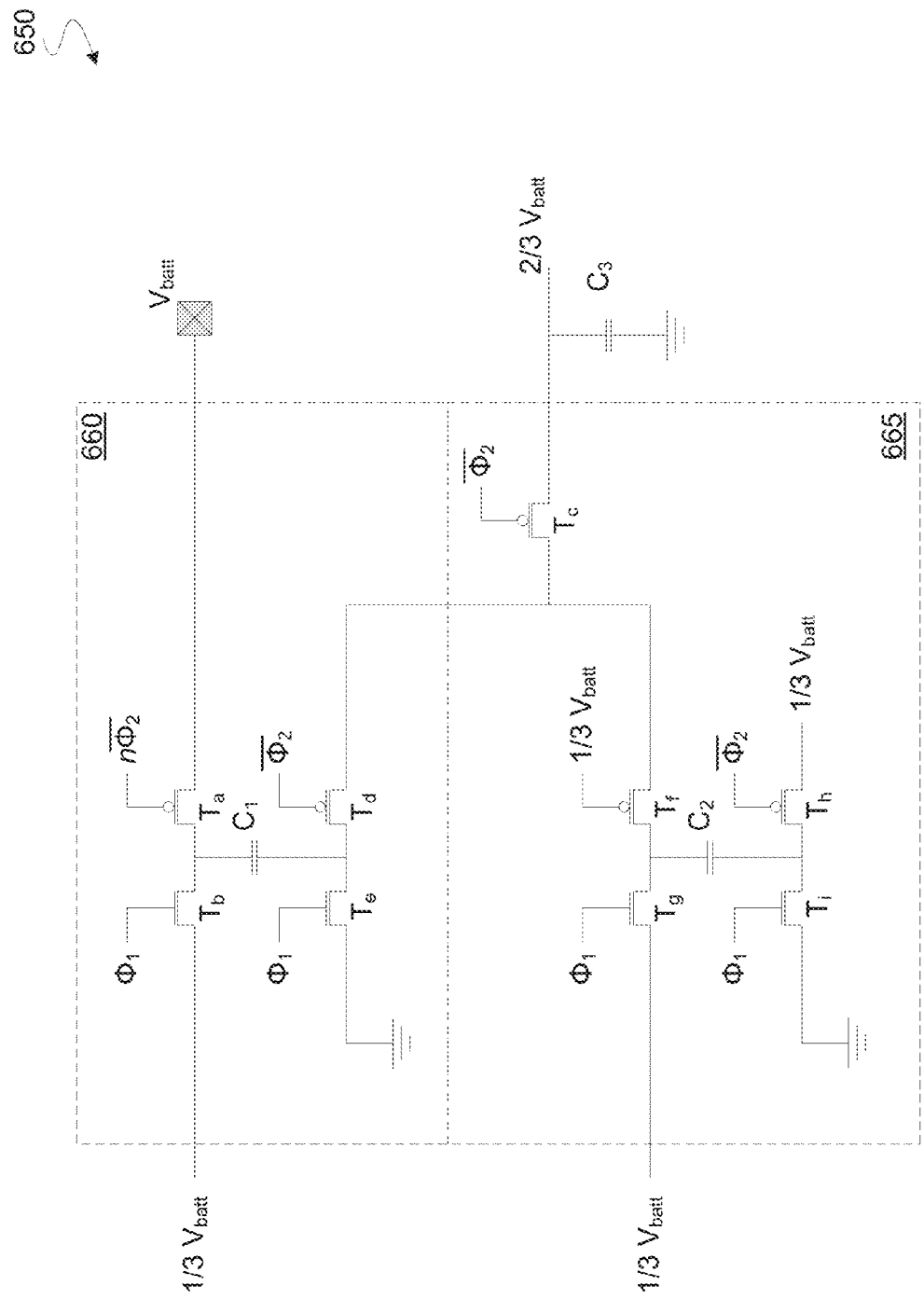
FIG. 6B is a functional block diagram illustrating elements of a bidirectional direct current to direct current converter of an eye-mountable device according to an embodiment of the disclosure.

FIG. 6B shows an example of circuitry 650 that may be included in bi-directional DC-DC converter 625 or other such DC-DC converter logic to drive an accommodation actuator according to an embodiment. Circuitry 650 is merely one example of such DC-DC converter logic, and may not be limiting on certain embodiment. Circuitry 650 may provide a series-parallel switched capacitor functionality that supports operation with three voltage levels—i.e, $V_{batt}$, ⅔($V_{batt}$) and ⅓($V_{batt}$)—and a reference potential such as ground. However other embodiments may employ DC-DC converter circuitry to operate with more, fewer and/or different voltage levels.

Series-parallel functionality may include circuitry 650 transitioning between two modes at different times. Such modes may be variously determined based on a control signal $\Phi_1$ and an inverted version of another control signal $\Phi_2$—e.g., where such control signals are signals $\Phi_1$ 532, $\Phi_2$ 534, respectively. The control signals $\Phi_1$, $\Phi_2$ may be provided via level shifting circuitry (not shown) that is to improve power efficiency of the control logic. For example, such power shifting circuitry may provide to transistor $T_a$ of circuit 660 an inverted version of $\Phi_2$ that is amplified by a factor n (e.g., where n is greater than one). Level shifting may enable compatibility with a plurality of power sources—e.g., including a power source providing one or more voltages which exceed a breakdown voltage of transistors used for a digital logic core in some process nodes. However, such level shifting is not limiting on certain embodiments.

A first mode of circuitry 650 may be configured when $\Phi_1$ and the inverted version of $\Phi_2$ are each in a respective logic high state. In such a first mode, a capacitor $C_1$ of circuit 660 is coupled by active transistors $T_b$, $T_e$ between the voltage level ⅓($V_{batt}$) and a reference voltage and a capacitor $C_2$ of circuit 665 is coupled by active transistors $T_g$, $T_i$ between ⅓($V_{batt}$) and the reference voltage. Accordingly, capacitors $C_1$ and $C_2$ are in parallel with one another in the first mode. A second mode of circuitry 650 may be configured when $\Phi_1$ and the inverted version of $\Phi_2$ are each in a respective logic low state. In such a second mode, capacitors $C_1$, $C_2$ are coupled in series with one another by active transistors $T_a$, $T_d$, $T_f$, $T_h$ between the voltage levels $V_{batt}$ and ⅓($V_{batt}$). Although $T_f$ is shown as being controlled by the voltage level ⅓($V_{batt}$), it may alternatively be operated by instead coupling an inverted version $\Phi_2$ bar of $\Phi_2$ to its gate terminal. A capacitor $C_3$ coupled to the voltage level ⅔($V_{batt}$) may serve as an output voltage store during operation of circuitry 650.

What is claimed is:

1. An eye-mountable device, comprising:
   an enclosure material;
   an accommodation actuator disposed within the enclosure material;
   a controller including integrated circuitry configured to provide the accommodation actuator with a supply voltage at a first level, to perform a step-wise transition of the supply voltage from the first level to a second level, wherein the controller successively maintains the supply voltage temporarily at each of one or more intermediate levels between the first level and the second level, and to provide the accommodation actuator with the supply voltage at the second level, wherein the eye-mountable device has a first optical strength in response to the first level of the supply voltage, and wherein the eye-mountable device has a second optical strength in response to the second level of the supply voltage;
a battery, wherein the controller comprises a bidirectional direct current to direct current (DC-DC) converter to recharge the battery with charge from the accommodation actuator during the step-wise transition of the supply voltage from the first level to the second level.

2. The eye-mountable device of claim 1, wherein the accommodation actuator includes a liquid crystal cell.

3. The eye-mountable device of claim 1, wherein a concave surface of the enclosure material is configured to be removeably mounted over a cornea and a convex surface of the enclosure material is configured to be compatible with eyelid motion when the concave surface is so mounted.

4. The eye-mountable device of claim 1, the controller further to perform another step-wise transition of the supply voltage from the second voltage level to the first voltage level.

5. The eye-mountable device of claim 1, the controller further to perform a linear transition of the supply voltage from the second level to the first level prior to the step-wise transition.

6. The eye-mountable device of claim 1, wherein the supply voltage is a differential voltage across the accommodation actuator.

7. The eye-mountable device of claim 1, wherein the controller to switchedly reverse a direction of coupling of the accommodation actuator between a node providing the supply voltage and a node providing a reference potential.

8. The eye-mountable device of claim 1, the controller further to provide a sequence of cycles of the supply voltage, the cycles each including a respective step-wise transition of the supply voltage, wherein a frequency of the cycles is equal to or greater than sixty (60) Hertz.

9. The eye-mountable device of claim 1, wherein the bidirectional DC-DC converter includes a series-parallel switched capacitor circuit.

10. The eye-mountable device of claim 1, the controller further to receive an indication of a direction of gaze by a user of the eye-mountable device, wherein the controller to change a level of the supply voltage in response to the indication of the direction of gaze.

11. A method implemented by an eye-mountable device, the method comprising:
providing an accommodation actuator with a supply voltage at a first level, wherein the eye-mountable device includes an enclosure material and an accommodation actuator disposed within the enclosure material, wherein the eye-mountable device has a first optical strength in response to the first level of the supply voltage;
performing a step-wise transition of the supply voltage from the first level to a second level, including successively maintaining the supply voltage temporarily at each of one or more intermediate levels between the first level and the second level;
during the step-wise transition of the supply voltage from the first level to the second level, recharging a battery disposed within the enclosure material with charge from the accommodation actuator, wherein the battery is recharged with a bidirectional direct current to direct current (DC-DC) converter; and
providing the accommodation actuator with the supply voltage at the second level, wherein the eye-mountable device has a second optical strength in response to the second level of the supply voltage.

12. The method of claim 11, wherein the accommodation actuator includes a liquid crystal cell.

13. The method of claim 11, further comprising performing another step-wise transition of the supply voltage from the second voltage level to the first voltage level.

14. The method of claim 11, further comprising performing a linear transition of the supply voltage from the second level to the first level prior to the step-wise transition.

15. The method of claim 11, further comprising switchedly reversing a direction of coupling of the accommodation actuator between a node providing the supply voltage and a node providing a reference potential.

16. The method of claim 11, further comprising:
providing a sequence of cycles of the supply voltage, the cycles each including a respective step-wise transition of the supply voltage, wherein a frequency of the cycles is equal to or greater than sixty (60) Hertz.

17. A contact lens, comprising:
an enclosure material, wherein a concave surface of the enclosure material is configured to be removeably mounted over a cornea and a convex surface of the enclosure material is configured to be compatible with eyelid motion when the concave surface is so mounted;
an accommodation actuator disposed within the enclosure material, the accommodation actuator including a liquid crystal cell;
a controller including integrated circuitry configured to provide the liquid crystal cell with a supply voltage at a first level, to perform a step-wise transition of the supply voltage from the first level to a second level, wherein the controller successively maintains the supply voltage temporarily at each of one or more intermediate levels between the first level and the second level, and to provide the accommodation actuator with the supply voltage at the second level, wherein the contact lens has a first optical strength in response to the first level of the supply voltage, and wherein the contact lens has a second optical strength in response to the second level of the supply voltage;
a battery, wherein the controller comprises a bidirectional direct current to direct current (DC-DC) converter to recharge the battery with charge from the accommodation actuator during the step-wise transition of the supply voltage from the first level to the second level.

18. The contact lens of claim 17, the controller further to perform another step-wise transition of the supply voltage from the second voltage level to the first voltage level.

19. The contact lens of claim 17, wherein the controller to switchedly reverse a direction of coupling of the accommodation actuator between a node providing the supply voltage and a node providing a reference potential.

20. The contact lens of claim 17, the controller further to provide a sequence of cycles of the supply voltage, the cycles each including a respective step-wise transition of the supply voltage, wherein a frequency of the cycles is equal to or greater than sixty (60) Hertz.

* * * * *